Figure 1:
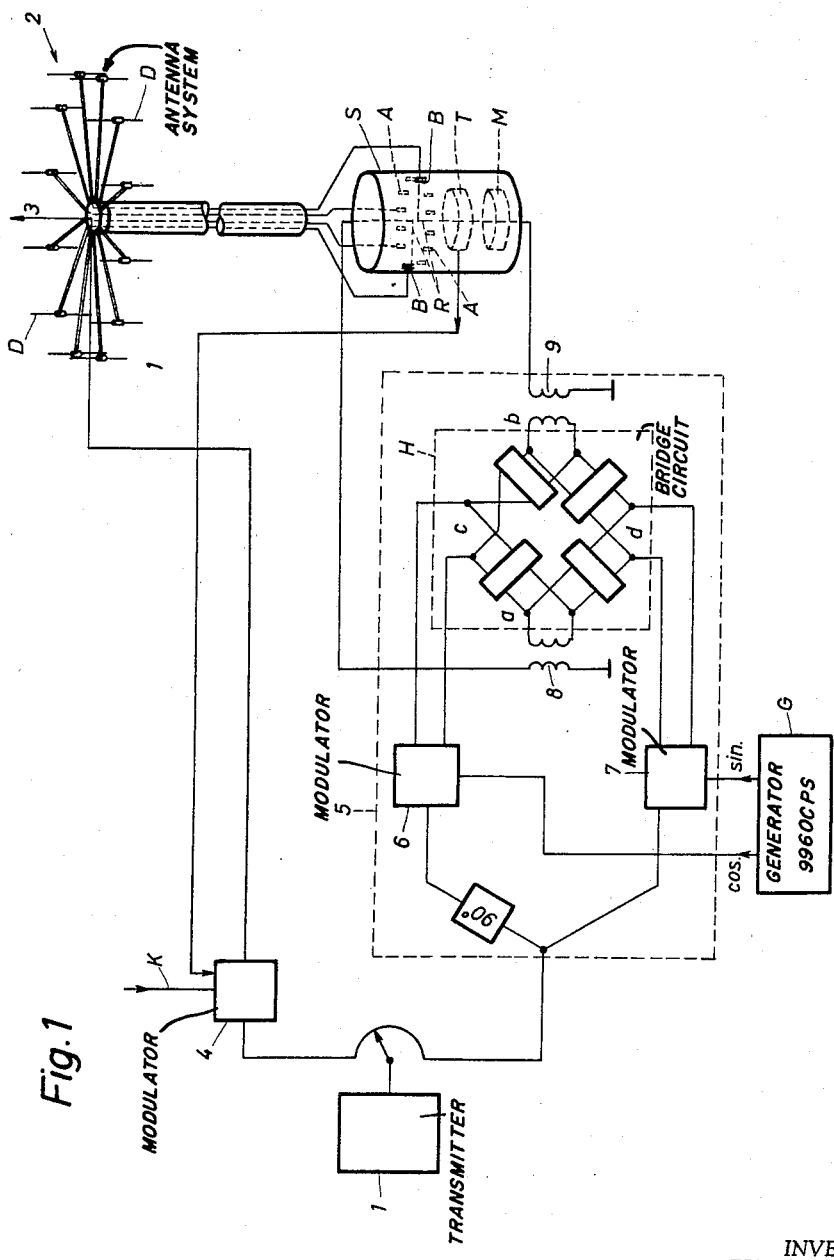

3,181,159
OMNIDIRECTIONAL BEARING SYSTEM
Ernst Kramar and Fritz Steiner, Pforzheim, Germany, assignors to International Standard Electric Corporation, New York, N.Y., a corporation of Delaware
Filed Mar. 9, 1960, Ser. No. 13,931
Claims priority, application Germany, Mar. 28, 1959, St 14,948
9 Claims. (Cl. 343—106)

This invention relates to a wide-aperture Doppler type omnidirectional beacon system which is suitable for achieving a higher siting independency and stability of direction determination.

With conventional types of VOR-beacons, operating with a small-aperture antenna system, the greatest problem in practice is the choice of a proper site, due to considerable bearing errors or imperfections caused by multipath propagation. As is well-known, such imperfections can be avoided by the employment of wide-aperture systems.

There is already known a wide-aperture Doppler type VOR-beacon system which is suitable for co-operating with the conventional VOR-receivers. It consists of a system of circularly arranged antennas (circular antenna array) with a carrier antenna located at the center of this circle. The feeding of the entire antenna system is effected in such a way that the carrier antenna transmits about 90% of the energy of the VOR-transmitter, while the remaining 10% of the energy is transmitted via the circular antenna array which is successively fed via a switch. The R.F.-energy, which is transmitted by the carrier antenna, in order to comply with the data prescribed by ICAO-standards at its reception, is displaced in frequency by an amount of 9960 c.p.s. with respect to energy transmitted by the circular antennas. This energy is amplitude-modulated with a frequency of 30 c.p.s. which, in this particular case, represents the phase reference signal. The frequency signal of 9960 c.p.s. corresponds to the frequency of the subcarrier for the reference signal as prescribed with respect to the conventional VOR-beacons. As is well-known, in the case of conventional VOR-beacons, the reference signal is transmitted omnidirectionally and is in effect a frequency modulation of a subcarrier frequency of 9960 c.p.s. with 30 c.p.s. which adheres to the prescribed ICAO-standard frequency deviation of 480 c.p.s. The directional modulation is produced at the receiving end due to the rotation of a cardioid pattern at the transmitting end, as an amplitude modulation of the received R.F.-energy.

Accordingly, in the just mentioned and already known Doppler type VOR-beacon, the reference signal is transmitted as an amplitude modulation of the energy transmitted by the carrier antenna. The directional modulation which is realized at a remote receiving point, results from the actual or simulated antenna rotation (cyclical connection) round a circular path as carried out at the transmitting end and, as already known, exists at the receiving end as a frequency modulation with the gyration frequency of 9960 c.p.s. produced by a beat between the two received R.F.-carrier wave frequencies.

In order to comply with the recommendations as laid down by ICAO-standards with respect to VOR-beacons it is further necessary, in the case of the fixed gyration frequency of 30 c.p.s. and the likewise fixed frequency deviation of 480 c.p.s. to make the diameter of the antenna circle correspondingly large. The diameter of the antenna should correspond to about 5 operating wavelengths, because the frequency deviation is proportional to the diameter of the antenna circle and to the gyration frequency, or to the velocity of switching as achieved on the circular path. In other words, the frequency deviation is proportional to the velocity of the motion of a single antenna on a circular path as simulated by the cyclical commutation.

Furthermore, a bearing system has already been proposed which is aimed at reducing the costs of antenna systems for such types of modified VOR-beacons. This reduction of expenditure is achieved in that with half a diameter of the antenna circle the necessary frequency deviation of 480 c.p.s. is achieved in that not a single antenna is simulated to rotate, but that instead of the fixed antenna located at the center of the circular array, a second antenna of the circular array is being fed. In other words, two antennas disposed exactly or almost exactly opposite each other on a diameter, are simultaneously simulated to rotate. One transmits about 90% of the energy displaced in frequency by a certain amount (9960 c.p.s.) amplitude-modulated with the reference signal of 30 c.p.s., while the other antenna transmits about 10% of the energy of the unmodulated carrier wave.

However, the conventional and already proposed systems can still be considerably improved in accordance with the invention, as will be described in particular hereinafter.

In order to obtain at the receiving end a beat frequency of 9960 c.p.s. in an almost sinusoidal manner, the energy of the two carrier frequencies, that is the carrier and one sideband, transmitted by the beacon system must be very different. If the energies of the two rotating antennas are in a ratio of approximately 9:1, then a sinusoidal beat frequency is still warranted.

Furthermore, either with conventional or other proposed systems it is unavoidable that the received energy appears to be amplitude-modulated with the gyratron frequency at the receiving side due to the reflective interaction of the beacon antennas. This amplitude modulation has a very disturbing effect because it depends on the direction, and is therefore likely to cause bearing errors or imperfections. With the conventional system employing a carrier antenna and *one* rotating antenna there also appears, in addition to the wanted amplitude modulation of the carrier wave with the difference frequency (9960 c.p.s.), also an unwanted phase modulation. This causes a loss of transmitting or receiving energy respectively.

Accordingly this invention proposes a radio bearing system using the Doppler principle, and employing an actual or simulated circular antenna motion. It is further proposed to provide at the transmitting end (beacon) a carrier antenna, and two antennas disposed almost exactly opposite each other and which are simulated in a manner that the carrier antenna transmits a high-frequency first carrier frequency which is amplitude-modulated with a low-frequency phase reference signal synchronized with the circular motion (e.g. 30 c.p.s. reference phase signal), while the two antennas located on the circular path each transmit a second and third carrier frequency lying at an equally spaced relation (e.g. 9960 c.p.s. subcarrier frequency) above and below the first carrier frequency. The phases of the carrier frequencies correspond to those of side bands which are obtained from the amplitude modulation of the first carrier frequency with a corresponding auxiliary carrier frequency (9960 c.p.s.). At the receiving end there are provided means for receiving the different carrier frequencies, for obtaining the auxiliary carrier frequency, the reference phase signal, and for obtaining, by way of a frequency demodulation of the auxiliary carrier frequency, an A.C.-voltage, the phase of which with respect to the reference phase signal, indicates the direction of incidence.

Analogously, the principles of the proposed system can also be applied to the receiving system, i.e. it may also be employed with a direction finder.

Accordingly, an object of the present invention is to provide an omnidirectional radio bearing system using the Doppler principle and employing an actual or simulated circular antenna motion for employment with a direction finder, whereby at the transmitting end (object of direction-finding) there is transmitted a high-frequency carrier wave without any directional information. The arrangement according to the invention comprises at the receiving end (direction finder) a carrier antenna located at the center of the array, and further the circular motion of the two antennas disposed almost exactly opposite each other on a diameter, is realized or simulated in a manner such that the carrier wave energy as received by the carrier antenna, is directly fed to the receiver inlet. The carrier energies which are received by the two antennas arranged on the circular path, however, are modulated separately and without carriers, with an auxiliary carrier frequency of e.g. 9960 c.p.s., and the resulting side bands of the first order are fed to the receiver inlet. There is obtained subsequent to the amplitude demodulation an auxiliary carrier frequency from which, by a frequency demodulation, there is derived the A.C.-voltage containing the directional information, while the reference phase signal is obtained in the manner as known per se, from a generator which is synchronized with the antenna rotation frequency.

In this type of Doppler beacon system, or a direction finder respectively, some considerable advantages will result over conventional types of systems. At a receiver located at a remote receiving point from such omnidirectional beacon this kind of transmission acts like the transmission of a modulated carrier wave transmitted by a single antenna, as is the case with a normal broadcasting transmitter. Thus, there is practically received a carrier wave which is amplitude-modulated by 9960 c.p.s. without any non-linear distortion, whereas in the conventional and proposed types of systems the low-frequency is produced by a beat of two R.F.-carrier frequencies resulting in distortion.

A further advantage with respect to the transmitter end, resides in the fact that the antennas of the circular array can be fed with a very small portion of the energy which meets the requirements laid down by ICAO-standards, specifically in achieving a modulation index of 30%, which is 2.25% of the total energy.

Since there is provided a carrier antenna adapted to transmit the carrier wave which is amplitude-modulated with the reference signal, and in addition thereto, there are provided *two* antennas actually or apparently rotating on the circular path, there is produced at the remote receiving point a double site diversity, such that the siting independency is still further increased.

One of the objects of this invention is to design a radio beacon which complies with the requirements demanded by ICAO-standards, especially in view of the modulation index of the carrier wave of 30%, in order that the conventional receivers intended for co-operation with the VOR-beacon systems, can be used without having to be altered. Naturally no need for complying with these standards is necessary in the case of a direction finder.

For this reason the carrier and second and third carrier energies as fed to the receiver input are in such an energy ratio that the modulation indices up to 100% are realized. With respect to a direction finder this results in an increase in sensitivity.

Figure 2:
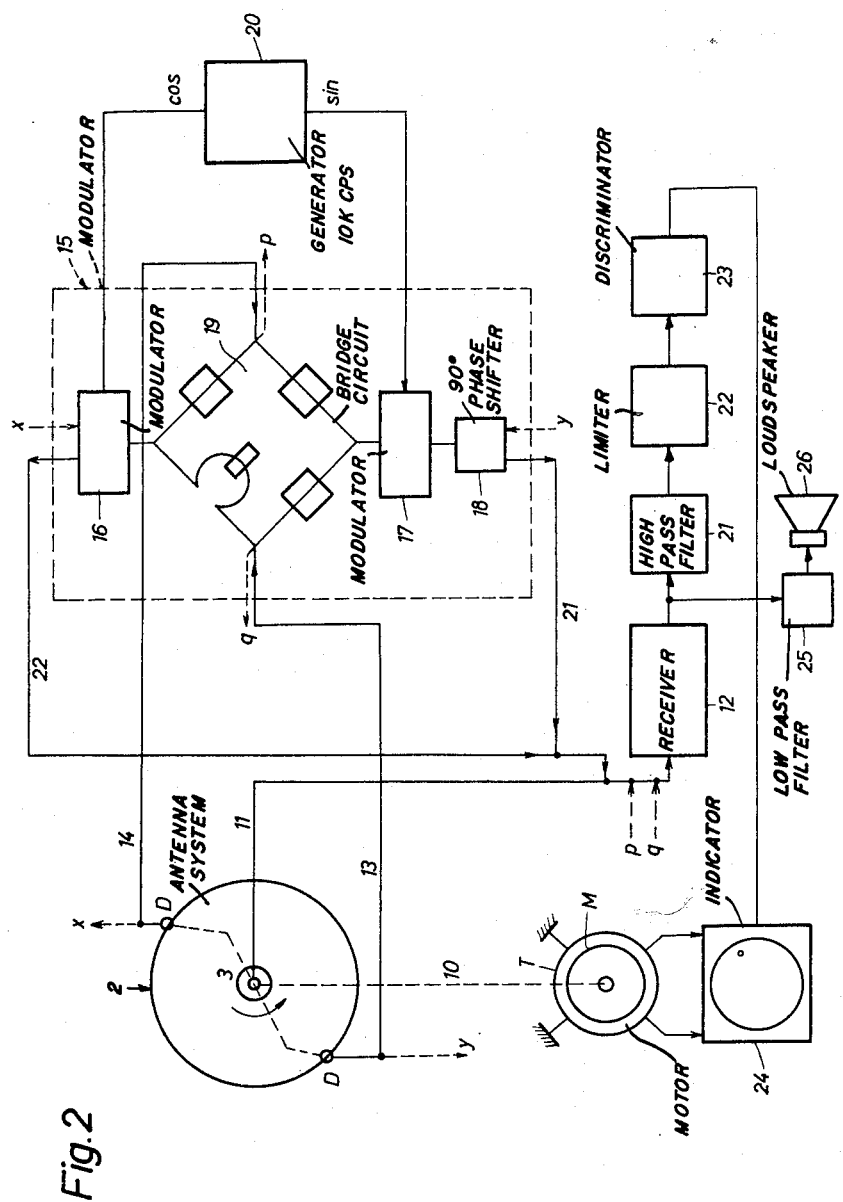

The above mentioned and other features and objects of this invention and the manner of attaining them will become more apparent and the invention itself will be best understood by reference to the following description of an embodiment of the invention taken in conjunction with the accompanying drawings, in which:

FIG. 1 schematically shows a radio beacon system, and FIG. 2 illustrates a direction finder utilizing the idea of invention.

In designing and feeding a beacon system according to this invention, it is possible to separately produce the first carrier frequency, as well as the second and third carrier frequencies, and to separately feed them to the various antennas in the proper phase relation. FIG. 1 illustrates a schematic representation of a beacon system in which the second and third carrier wave energies are produced by modulation of one portion of the transmitter energy with an auxiliary carrier frequency. The major portion of the energy of transmitter 1, namely 95.5%, is fed to carrier antenna 3 of the circular antenna system 2 consisting of a number of single antennas D. However, prior thereto, this R.F.-energy is amplitude-modulated in a modulator 4 with the reference signal of 30 c.p.s., which is necessary for the direction-finding purpose. This reference signal is obtained in the conventional manner by means of a generator T from the actual or simulated gyration frequency of the circular antenna system. In the afore-mentioned modulator 4 it is still possible that, at the point K a further intelligence carrier modulation is impressed upon the carrier.

A very small portion of the output of transmitter 1, amounting to 4.5%, of the energy is amplitude-modulated in modulator 5 and consisting of a combination of push-pull or any other conventional types of modulators (e.g. variable reactances, Zener-diodes). A bridge circuit H forms both the sum and difference outputs from low-frequency voltage of generator G, of 9960 c.p.s., in such a way that the modulation products as obtained in the modulators 6 and 7, are fed to two diagonally opposing impedance points (c, d) of said bridge circuit H. At the other two opposing points (a and b) of which only the upper or the lower side bands respectively, may then be coupled out in the conventional manner with the aid of coupling arrangements 8 and 9. Thereupon the side band energies are fed e.g. to two metallic segments B arranged opposite each other on a cylindrical rotor of a rotating, capacitively-coupled switch of the type described in copending application Serial Number 794,014, filed Feb. 18, 1959, now Patent No. 3,048,843, and consisting of stator S and of rotor R, where the side band energies, due to rotation of the rotor R effected by a motor M, are coupled successively to all segments A of the stator S, and are thus fed to two antennas of the circular array. The application referred to relates to a capacitively-coupled scanning switch for use in DF-Systems of the commutated antenna type, simulating a uniform antenna motion in a circular path at a relatively slow frequency combined with a motion to and fro in a sector of about 40 degrees at a relatively high frequency, the high frequency of scanning producing maximum frequency deviation, the low frequency being the envelope of the frequency modulation is evaluated for direction finding by phase comparison with the low scanning frequency. The switch is composed of a motor-driven rotor containing a number of metallic segments according to the mode of desired scanning and a stator with metallic stator- and collector segments respectively. The stator segments are connected to the antennas whilst the collector segments are connected to the receiver inlet. This scanning switch design permits the antenna array to be scanned progressively simulating two scanning frequencies by which manner transient response characteristic of the receiver is made ineffective, as to the high scanning frequency.

Accordingly, a receiver located at a remote receiving point of an omnidirectional radio beacon operating as described hereinbefore, will thus receive the carrier which is transmitted via the carrier antenna 3 and is amplitude-modulated with the reference signal (30 c.p.s.), as well as the two side bands as produced by the modulation with the auxiliary carrier energy (9960 c.p.s.) which are respectively transmitted simultaneously by two antennas D of the circular array. In the receiver which cooperates with this beacon system, there is received a carrier wave of an ordinary broadcasting transmitter which is amplitude-modulated by 9960 c.p.s. L.F.-voltage. At the receiving end the two modulations of 30 c.p.s. and 9960 c.p.s. are rectified in the conventional manner and are separated by way of filters.

If now the capacitively-coupled switch of the transmitter that is, the rotor R, is in rotation then, as is well-known, at the receiving end the L.F.-voltage of the frequency of 9960 c.p.s., as obtained from the amplitude modulation of the carrier wave, is frequency-modulated with the gyration (rotation) frequency, and the phase of the L.F.-voltage of 30 c.p.s., which is equal to the gyration frequency of 30 c.p.s., indicates the direction of incidence of the wave front as received by the receiver. The phase measuring indication is effected with the aid of one of the conventional metering and indicating arrangements. The receiving equipment exactly corresponds to the conventional type of VOR-receivers.

The practical application of the inventive idea to a direction finder co-operating with a transmitter without any directional modulation, is schematically shown in FIG. 2. The antenna system 2 comprising the single aerial 3 located at the center of the circular array, and the single antennas D arranged on the circular path, corresponds exactly to that as shown in FIG. 1. Likewise, the capacitively-coupled switch, with the aid of which the antennas on the circular path are connected successively to the receiving equipment, exactly corresponds to that of FIG. 1. This capacitively-coupled switch is driven by the motor M, as is denoted by the dashlined connection 10.

Via line 11, the energy as received by the carrier antenna 3 (single aerial located at the center of the circular array) is directly fed to the input of receiver 12. The energies which are respectively received by the two antennas D of the circular array are fed via lines 13 or 14 respectively to modulator 15, which is constructed in the same way as the modulator 5 of FIG. 1. This modulating arrangement substantially consists of two modulators 16 and 17, the latter being either followed or preceded by a 90°-phase-shifting device 18, and by a bridge circuit 19 consisting of impedances, of which the two opposing points lead into modulator 16 or 17 respectively.

In the position as indicated by the solid line in FIG. 2, the lines 13 and 14 are leading to two oppositely arranged points of the bridge circuit. Accordingly, in this case the modulator 15 is operated in a reversed manner to that of modulator 5 in FIG. 1. It can be proved that this has no influence upon the function or operation of the system. Furthermore the energies (powers) as received by the antennas, and which is denoted by the dashlines at points $x$ and $y$ at the antennas and at the modulators, can be first led into the modulators, and the sidebands can be coupled-out at oppositely arranged points of the bridge circuit, as is likewise denoted by the dashlines $p$ and $q$ at the inlet of the receiver. In this case the function of the modulator 15, as indicated by the dashlines, will exactly correspond to that of the arrangement 5 in FIG. 1.

The modulators 16 and 17 are also fed with two orthogonally related voltages of the auxiliary carrier frequency (e.g. 10 kc.) from a generator 20. On account of this, and in the conventional manner, there are produced at the output of the modulators on lines 21 or 22 respectively the sidebands as modulation products of the energy as received by the antennas of the circular array and of the auxiliary carrier energy. Together with the energy of the first carrier as received by the carrier antenna, they are fed to the input of receiver 12. In this receiver 12 this will have an effect as if there would have been received a carrier wave amplitude-modulated with the frequency of the auxiliary carrier wave. By the rotation of the switch, or respectively by the actual or simulated rotation of the single antennas D on the circular path the auxiliary carrier frequency, subsequently to the demodulation is frequency-modulated with the gyration frequency. The L.F.-voltage of the frequency of the auxiliary carrier (10 kc.) as appearing at the outlet of the receiver 12, is fed via a high-pass filter 21 not permitting the passage of intelligence modulation of the carrier frequency, to a limiter 22, and is thereupon demodulated in frequency demodulator (discriminator) 23. The L.F.-voltage as appearing at the output of the demodulator 23, the phase of which when compared with a reference signal obtained from generator T, and which is synchronized with the rotation or gyration frequency of the switch, indicates the direction of incidence of the wave front. This comparison is accomplished in phase metering and indicating device 24 of the conventional type. Any possible intelligence modulation of the carrier can be filtered out at the output of the receiver 12 via a low-pass filter 25, and can be made audible with the aid of a loudspeaker 26. FIGURE 1 shows the realization of the invention in the transmitting domain while FIGURE 2 shows the realization of the invention in the receiving domain as a direction finder. In the case of FIGURE 1, the receiver is a normal AM and FM receiver, e.g., a conventional VOR receiver, and in the case of FIGURE 2, the transmitter is a simple transmitter normally installed aboard an aircraft transmitting non-directional carrier signals. The antenna system of the Doppler direction finder of FIGURE 2 is equal in construction to the antenna system of the radio beacon shown in FIGURE 1. The center antenna 3 as well as the dipoles D receive the same RF energy as transmitted by a remote transmitting station, but the RF energies appearing at leads 13 and 14 (FIGURE 2), respectively are frequency-modulated at the gyration frequency of the dipoles due to their simulated motion. The RF energies received via leads 13 and 14 are transposed in frequency by a certain amount. This is achieved in the most simple way by an amplitude modulation causing sidebands. The two modulation sidebands are fed to the receiver 12 input terminal together with the energy received from the center antenna 3 via lead 11.

The modulation may be carried out in two different ways. The modulator arrangement according to FIGURE 2 comprises modulators 16 and 17 and a bridge circuit so that it operates like two single sideband modulators with suppressed carrier. In the first embodiment, as shown by the solid lines, the energy received by the dipoles D is firstly fed via leads 13 or 14, respectively, to the one pair of diametrically opposite corners of the bridge circuit and then modulated with the output signals of an auxiliary carrier frequency generator 20 applied to a first pair of terminals of the modulators 16 and 17, respectively, which modulators are connected with their second pair of terminals to the other diametrically opposite corners of the bridge circuit.

In the second embodiment, as shown in FIGURE 2 by broken lines, the energy received by the dipoles D is first fed to the modulators 16 and 17, respectively, as indicated by the arrows $x$ and $y$, respectively, and then coupled from the diametrically opposite corners of the bridge circuit and fed to the receiver input terminal as indicated by the broken arrow lines $p$ and $q$, respectively. It can thus be seen that the first embodiment is operating in a "reversed manner" with respect to the operation of modulator 5 in FIGURE 1, whereas the second embodiment of the modulation process corresponds exactly to that of modulator 5 in FIGURE 1. The output signals on leads 21 and 22 are the sideband frequencies as generated by modulating the received RF energy (leads 13 and 14) with the auxiliary frequency of generator 20 while the carrier is suppressed. These RF sideband signals are additionally frequency-modulated by virtue of the simulated gyration of the dipoles, these signals being fed to the receiver input together with the RM energy received by the center antenna 3.

While we have described above the principles of our invention in connection with specific apparatus, it is to be

What is claimed is:

1. An omnidirectional radio bearing system using the Doppler principle comprising a circular antenna array including at least a first antenna and second and third antennas disposed diametrically opposite each other and about said first antenna on a circular perimeter of which said first antenna constitutes the center of said circular array, means to generate a frequency modulation in the signals associated with said second and third antennas characteristic of a rotational state of said second and third antennas on said perimeter at a low frequency, the signals associated with said first antenna being unaffected by said frequency modulation, means to produce respectively upper and lower sidebands in the signals associated with said second and third antennas, means to detect said frequency modulation from the sidebands of said signals of said second and third antennas and means to compare the detected frequency modulation signal with the frequency of said rotational state to determine the phase difference therebetween.

2. An omnidirectional radio bearing system using the Doppler principle according to claim 1 wherein of the total energy of all the signals associated with said first, second and third antennas, substantially 95.5% is the proportionate energy of the signals associated with said first antenna and 2.25% of said total energy is the proportionate energy of the signals associated with each said second and third antennas.

3. An omnidirectional radio bearing system using the Doppler principle comprising a transmitter at a first location and a receiver at a second location, said transmitter comprising a circular antenna array including at least a first antenna and a second and third antennas disposed diametrically opposite each other and about said first antenna on a circular perimeter of which said first antenna constitutes the center of said circular antenna array, means coupling to said first antenna a source of high frequency carrier signal amplitude modulated with a low frequency signal, means coupling to said second and third antennas said high frequency carrier signal amplitude modulated with an auxiliary carrier frequency, the upper and lower sidebands of said high frequency carrier signal and said auxiliary carrier modulation being coupled respectively to said second and third antennas, means to produce a frequency modulation of said signals coupled to said second and third antennas characteristic of a rotational state of said second and third antennas on said perimeter at a rate equal to the frequency of said low frequency signal and synchronized thereto, said receiving means comprising means for obtaining from said transmitted signals said low frequency amplitude modulation signal and the frequency modulation low frequency signal and means for comparing both said low frequency signals to determine the relative phase therebetween and thereby the bearing of said receiver relative said transmitter.

4. An omnidirectional radio bearing system according to claim 3, further including means to maintain the ratio between the energy of said high frequency carrier and the upper and lower sideband signal energy at said second and third antennas such that on demodulation of said signals in said receiver, the auxiliary carrier frequency is restored without any non-linear distortion.

5. An omnidirectional radio bearing system using the Doppler principle comprising a circular antenna array including at least a first antenna and second and third antennas disposed diametrically opposite each other and about said first antenna on a circular perimeter of which said first antenna constitutes the center of said circular antenna array, a source of signals, means to produce a frequency modulation of the signals from said source received at said second and third antennas characteristic of a rotational state of said second and third antennas on said perimeter at a low frequency rate, means to modulate said signals received at said second and third antennas with an auxiliary carrier frequency signal to produce the upper and lower sidebands of said signals and auxiliary carrier modulation, receiving means for receiving and detecting said source signals from said first antenna and the output of said modulating means; means to detect the frequency modulation of said signals received at said second and third antennas and produced by said rotational state of said antennas and means to compare said detected frequency modulation signal and the frequency of said rotational state to determine the bearing of said signal source relative said receiver.

6. An omnidirectional radio bearing system using the Doppler principle comprising a transmitter at a first location and a receiver at a second location, said transmitter comprising a circular antenna array including at least a first antenna and second and third antennas disposed diametrically opposite each other and about said first antenna on a circular perimeter of which said first antenna constitutes the center of said circular antenna array, means coupling to said first antenna a source of high frequency carrier signal amplitude modulated with a low frequency signal, means to amplitude modulate said high frequency carrier signal with an auxiliary carrier frequency, said amplitude modulation means comprising a bridge circuit, first and second modulators, means coupling a first pair of impedances of said bridge to said first modulator, means coupling a second pair of impedances diagonally opposite said first pair to said second modulator, means coupling said auxiliary carrier signal with a 90° relative phase shift to said first and second modulators, means coupling to said first modulator said high frequency carrier signal, means coupling said high frequency carrier with a 90° phase shift to said second modulator, whereby there is produced as the outputs of said bridge circuit the upper and lower sidebands of the high frequency carrier modulated by said auxiliary carrier, means coupling one output of said bridge circuit to said second antenna, means coupling the other output of said bridge circuit to said third antenna, means to produce a frequency modulation effect of said signals coupled to said second and third antennas characteristic of a rotational state of said second and third antennas on said perimeter at a rate equal to the frequency of said low frequency signal and synchronized thereto, said receiving means comprising means for detecting from said transmitted and received signals said low frequency amplitude modulation signal and the frequency modulation low frequency signal and means for comparing both said low frequency signals to determine the bearing of said receiver relative said transmitter.

7. An omnidirectional radio bearing system according to claim 6 wherein said second and third antennas are rotated at a 30 c.p.s. rate and said high frequency carrier signal is amplitude modulated at said rotational rate and the frequency of said auxiliary carrier is 9960 c.p.s.

8. An omnidirectional radio bearing system according to claim 6 wherein said second and third antennas are fixed relative said first antenna and each other and the rotation of said second and third antennas is simulated by alternately coupling said sidebands signals to said second and third antennas at said rotational rate.

9. An omnidirectional radio bearing system using the Doppler principle comprising a circular antenna array including at least a first antenna and second and third antennas disposed diametrically opposite each other and about said first antenna on a circular perimeter of which said first antenna constitutes the center of said circular antenna array, a source of signals, means to produce a frequency modulation of the signals from said source received at said second and third antennas characteristic of a rotational state of said second and third antennas on said perimeter at a low frequency rate, a bridge circuit, means coupling the outputs of said second and third antennas to the respective inputs of said bridge circuit, first and second modulators, means coupling the outputs of said bridge circuit respectively to said first and second modulators, an oscillator generating an auxiliary carrier frequency signal, means coupling said auxiliary carrier signal in opposing phase to said first and second modulators whereby there is produced the upper and lower sidebands of the signals from said source amplitude modulated by said auxiliary carrier signal, a receiver, means coupling the output of said modulators and said first antenna to said receiver, means to detect the frequency modulation low frequency signal, comparison means, means coupling a low frequency signal equal to the rate of said rotational state and said detected frequency modulation signal to said comparison means whereby there is derived from said comparison means the phase differing therebetween indicative of the bearing of said source of signals relative said receiver.

References Cited by the Examiner

UNITED STATES PATENTS

| | | | |
|---|---|---|---|
| 2,367,372 | 1/45 | Purington | 343—102 |
| 2,411,518 | 11/46 | Busignies | 343—102 |
| 2,481,509 | 9/49 | Hansel | 343—118 |

OTHER REFERENCES

Anderson et al.: "The CCA Doppler Omnirange," Proceedings of the IRE, May 1959, pp. 808–821.

"Doppler Type High Frequency Radio Direction Finder," J. A. Fantoni and R. C. Benoit, Jr., IRE Convention Record, vol. 4, part 8, March 1956, pp. 165–171.

"Doppler-Effect Omni-Range," P. G. Hansel, Proceedings of the IRE, vol. 41, No. 12, December 1953, pp. 1750–1756.

CHESTER L. JUSTUS, *Primary Examiner.*

KATHLEEN H. CLAFFY, *Examiner.*